United States Patent [19]

O'Banion et al.

[11] Patent Number: 5,768,971
[45] Date of Patent: Jun. 23, 1998

[54] SCROLL SAW

[75] Inventors: Michael L. O'Banion, Westminster; Louis M. Shadeck, Timonium, both of Md.; Thomas R. Sommerville, Port Perry, Canada; Robert P. Welsh, Hunt Valley, Md.

[73] Assignee: Black & Decker Inc., Newark, Del.

[21] Appl. No.: 721,298

[22] Filed: Sep. 26, 1996

Related U.S. Application Data

[60] Provisional application No. 60/012,639, Mar. 1, 1996.
[51] Int. Cl.⁶ .................................. B27B 3/02; B26D 1/02
[52] U.S. Cl. .......................... 83/784; 83/699.21; 83/783
[58] Field of Search ............................ 83/783, 784, 785, 83/786, 816, 699.21

[56] References Cited

U.S. PATENT DOCUMENTS

| | | | |
|---|---|---|---|
| 164,787 | 6/1875 | Wescott et al. | 83/784 |
| 398,803 | 2/1889 | Sedwick | 83/785 |
| 2,602,478 | 7/1952 | Carpenter | 83/783 |
| 2,692,622 | 10/1954 | Heese . | |
| 2,721,587 | 10/1955 | Dremel . | |
| 2,796,098 | 6/1957 | Dreier . | |
| 2,869,600 | 1/1959 | Dreier . | |
| 4,503,742 | 3/1985 | Sutton | 83/783 |
| 4,681,006 | 7/1987 | Miller . | |
| 4,724,735 | 2/1988 | Rice . | |
| 4,813,322 | 3/1989 | Rice | 83/783 |
| 4,825,741 | 5/1989 | Wellington et al. . | |
| 4,838,138 | 6/1989 | Rice et al. | 83/783 |
| 4,841,823 | 6/1989 | Brundage | 83/786 |
| 4,949,616 | 8/1990 | Chang | 83/783 |
| 5,065,652 | 11/1991 | Legler et al. | 83/783 |
| 5,088,369 | 2/1992 | Rice et al. . | |
| 5,327,807 | 7/1994 | Chang . | |
| 5,351,591 | 10/1994 | Miyamoto et al. . | |
| 5,410,933 | 5/1995 | Miyamoto et al. . | |

FOREIGN PATENT DOCUMENTS

| | | |
|---|---|---|
| 1269308 | 5/1990 | Canada . |
| 2081124 | 9/1994 | Canada . |
| 0022351 | 5/1984 | European Pat. Off. . |
| 458715 | 4/1928 | Germany ................................ 83/784 |
| 7801974 | 11/1978 | Germany . |
| 8409471 | 9/1984 | Germany . |
| 3909607 | 9/1990 | Germany . |
| 29602437 | 6/1996 | Germany . |

Primary Examiner—Kenneth E. Peterson
Assistant Examiner—Sean A. Pryor
Attorney, Agent, or Firm—Bruce S. Shapiro; Adan Ayala

[57] ABSTRACT

A scroll saw with an adjustable tensioning mechanism includes a housing having an inner surface and a pivoting arm having a rearward end disposed within an opening in the housing. A first blade clamp is disposed at the forward end of the pivoting arm and secures the upper end of a saw blade. The lower end of the saw blade is secured in a second blade clamp disposed at the forward end of a lower arm. A wedge is disposed within the housing, in contact with the inner surface of the housing. The wedge also is disposed in contact with and translatable along a surface of the pivoting arm. A rod is linked to the wedge at one end and extends through the pivoting arm. The rod includes an upwardly turned arm. A cam having a spiral track is rotatably mounted at the front of the pivoting arm with the upwardly turned arm disposed in the track. Rotation of the cam causes the track to move along the upwardly turned arm, further causing the rod and wedge to move forwardly, with the contact between the wedge and the inner surface causing the wedge and the rearward end of the pivoting arm to pivot downwardly, and the forward end of the pivoting arm to pivot upwardly to increase the tension of the blade.

11 Claims, 8 Drawing Sheets

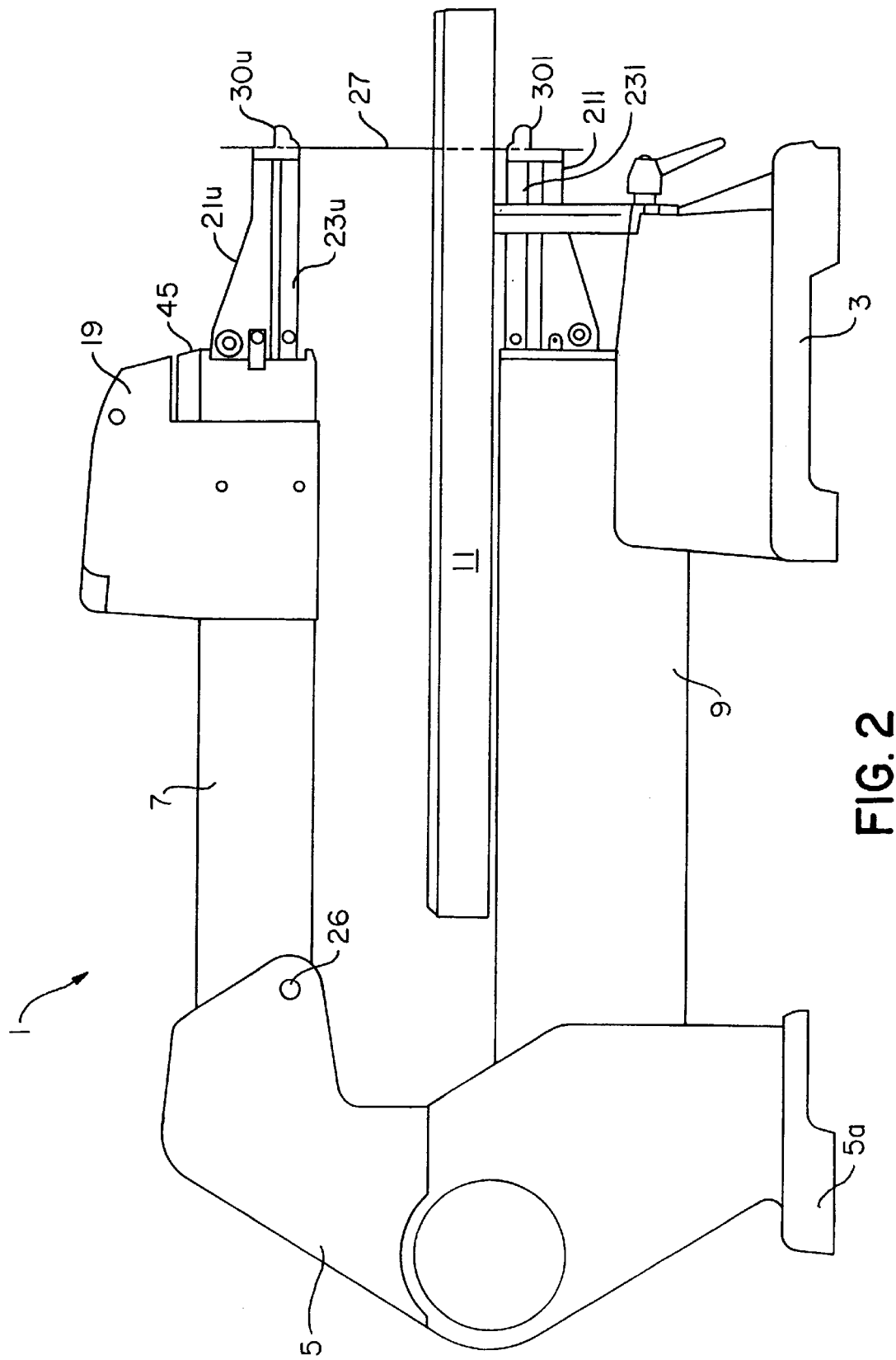

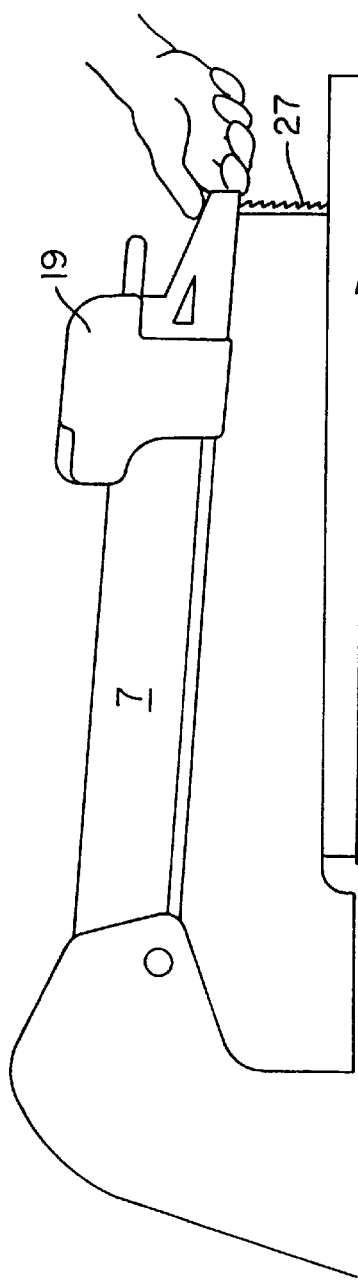
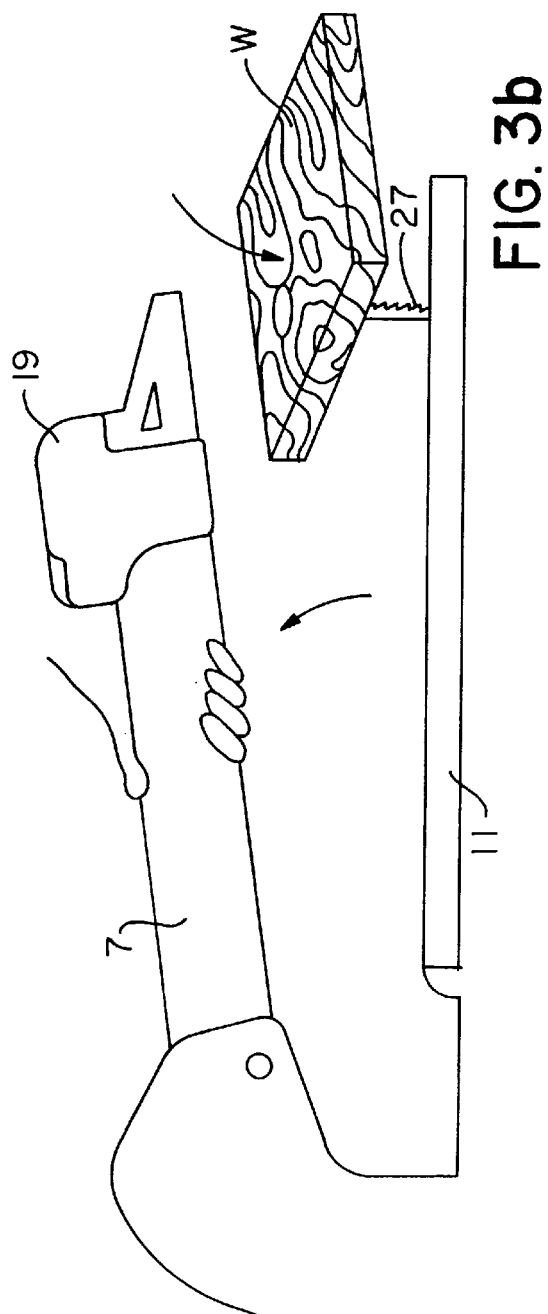

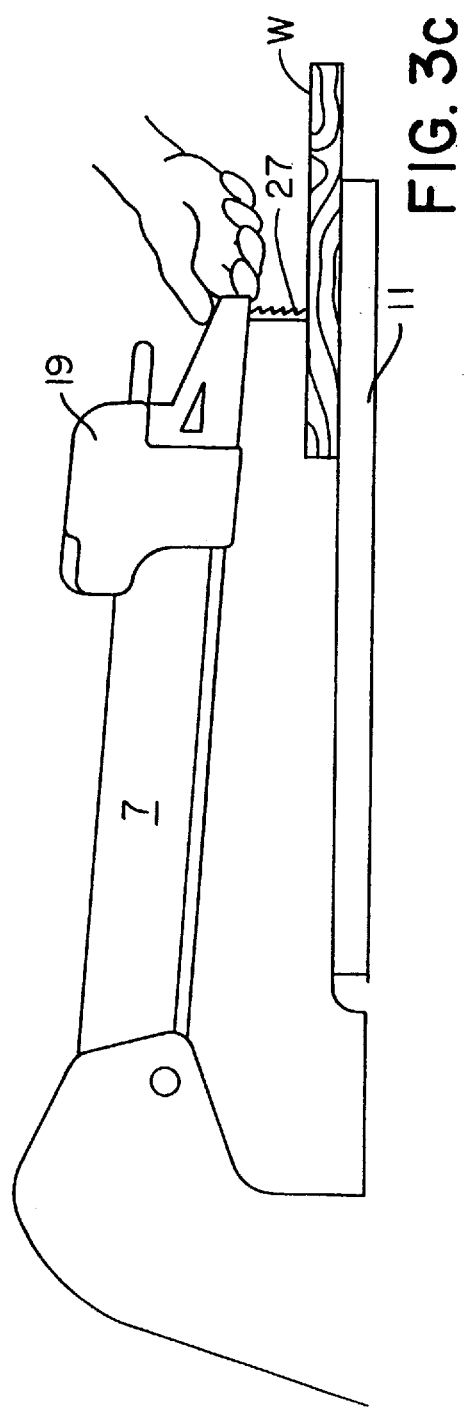

5,768,971

SCROLL SAW

CROSS REFERENCE TO RELATED APPLICATION

This application is based upon and claims priority under 35 U.S.C. §119 and 37 C.F.R. §1.78 of copending U.S. provisional application Ser. No. 60/012,639, filed on Mar. 1, 1996.

BACKGROUND OF THE INVENTION

1. Field of the Invention

The invention is directed to a scroll saw, and in particular, a scroll saw having a mechanism for varying the tension on the scroll saw blade.

2. Description of the Invention

Scroll saws are known in the art and include upper and lower arms extending forwardly from a housing. Blade clamps are disposed at the forward ends of the arms and each clamp secures one end of a generally vertically disposed blade. The blade extends through a hole in a workpiece support table. The blade is reciprocated in a generally vertical plane to achieve a precise cutting action, for example, by simultaneously reciprocating the arms in a vertical plane. The precise cutting action allows for detailed woodworking. However, in order to achieve the desired precision of cut, the blade must be properly tensioned. Accordingly, scroll saws may be provided with an adjustable tensioning mechanism for the blade.

SUMMARY OF THE INVENTION

The present invention is directed to a saw including a housing having an inner surface and a pivoting arm having rearward and forward ends. The rearward end of the pivoting arm is disposed within an opening in the housing and the pivoting arm extends forwardly from the housing. The pivoting arm is vertically pivotable relative to the housing about an axis intermediate of the rearward and forward ends. A first blade clamp is disposed substantially at the forward end of the pivoting arm. The blade clamp secures one end of a saw blade. A wedge is disposed within the housing, in contact with the inner surface of the housing. The wedge also is disposed in contact with and translatable along a surface of the pivoting arm. A rod is linked to the wedge and extends through the pivoting arm. Longitudinal translational movement of the rod causes translation of the wedge along the pivoting arm and the inner surface such that when the wedge move forwardly the contact between the wedge and the inner surface causes the wedge and the rearward end of the pivoting arm to pivot downwardly and the forward end of the pivoting arm to pivot upwardly thereby causing upward movement of the blade clamp to increase the tension of the blade.

In a further embodiment, the saw includes a housing, an upper pivoting arm and a first blade clamp disposed substantially at the forward end of the upper pivoting arm. The saw also includes a second blade clamp disposed below the first blade clamp and securing a second end of a blade. A workpiece support table is disposed between the first and second blade clamps and has a hole through which a blade may extend. When the lower end of the blade is released from the lower blade clamp, the upper pivoting arm may be pivoted such that the blade is pivoted vertically until the lower end of the blade passes through and clears the table opening.

In a further embodiment, when the upper end of the blade is released from the upper blade clamp, the upper pivoting arm may be pivoted such that there is a space between the upper blade clamp and the upper end of the blade.

DESCRIPTION OF THE DRAWINGS

FIG. 2 is a left side elevational view of the scroll saw shown in FIG. 1.

FIGS. 3a–3c are partial side elevational views of the scroll saw shown in FIG. 1 and illustrating a technique for quickly inserting a blade through an opening in a workpiece.

DETAILED DESCRIPTION OF THE PREFERRED EMBODIMENTS

Figure 1:
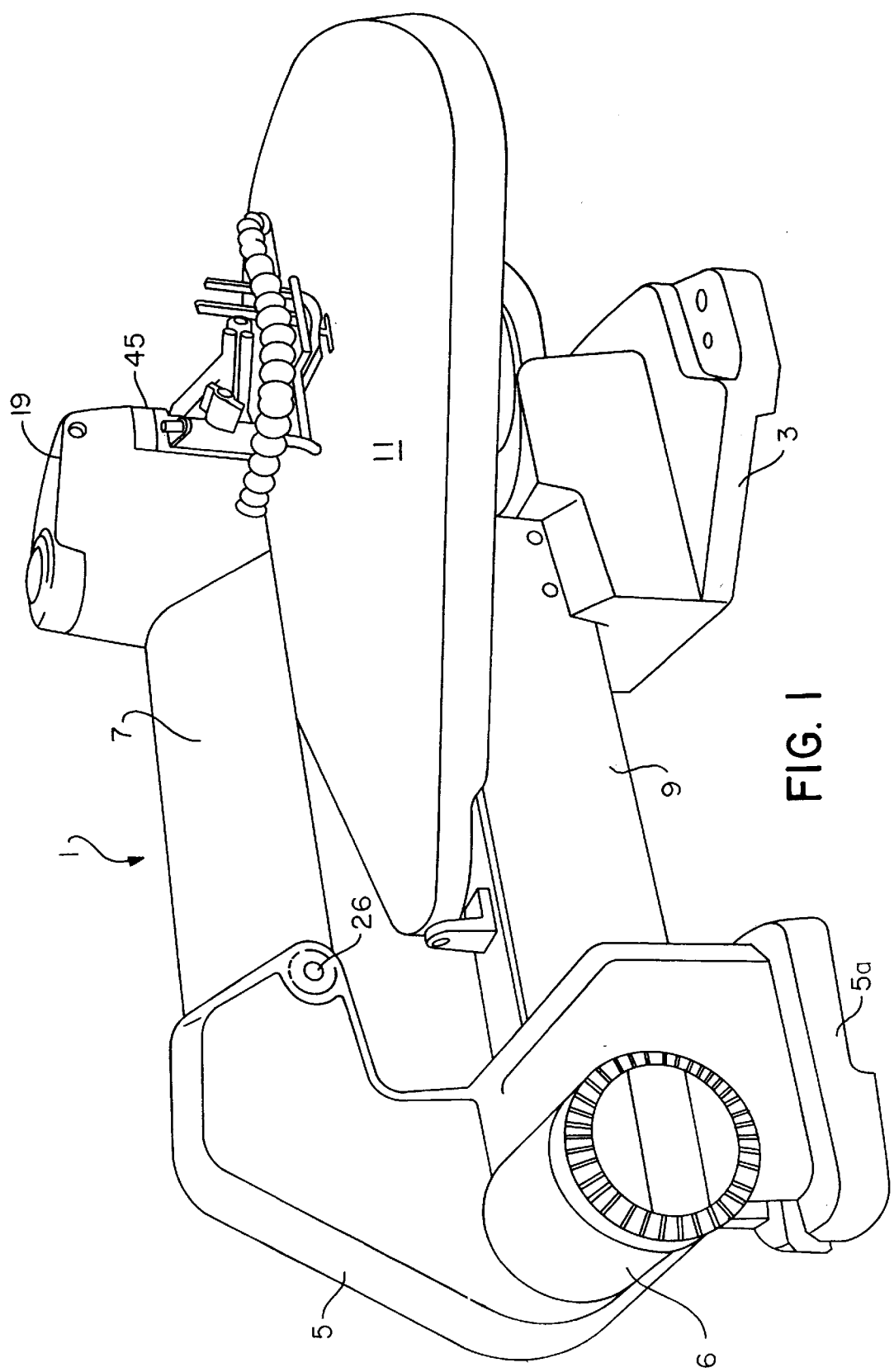
FIG. 1 is a perspective view of a scroll saw according to the present invention.
Figure 5:
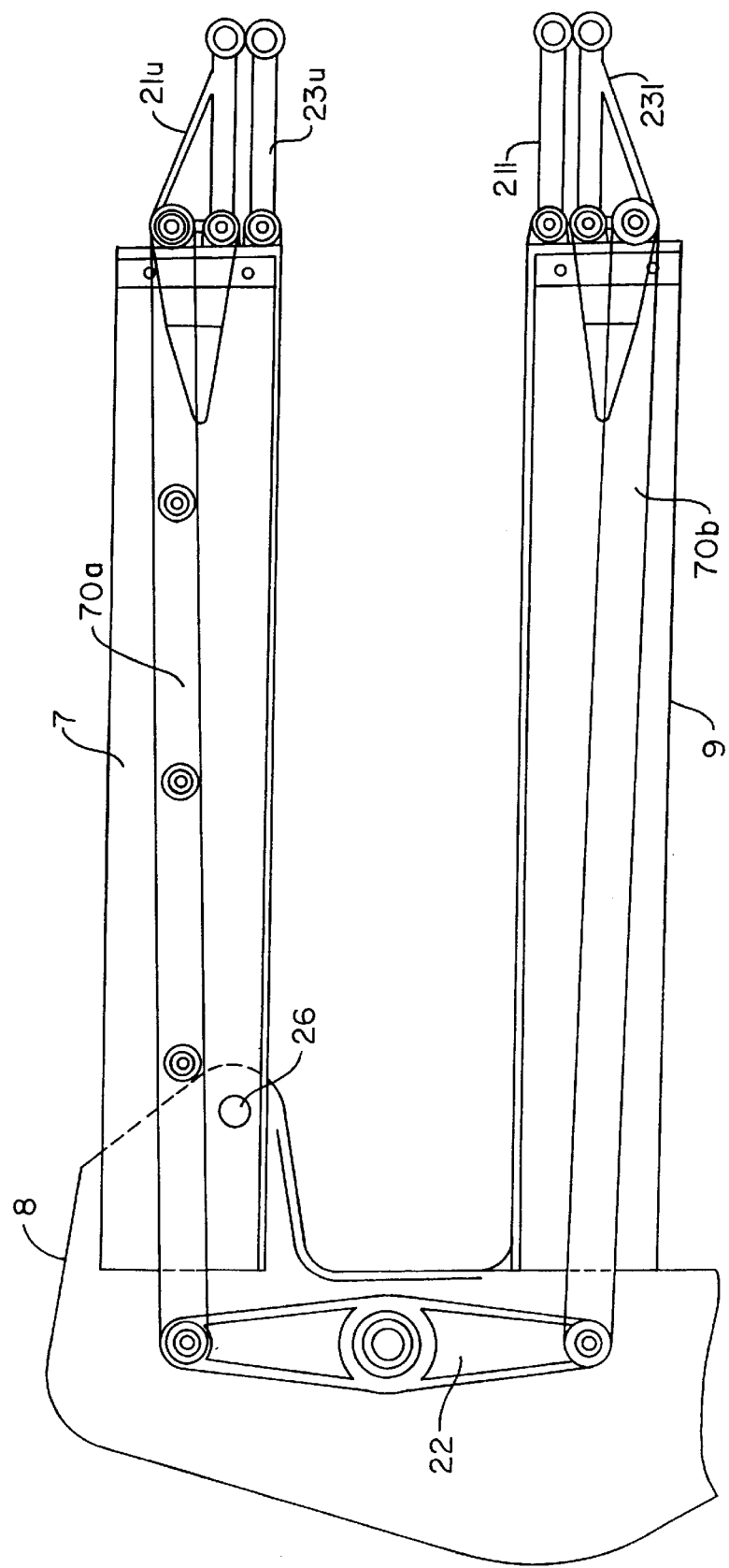
FIG. 5 is a partial left side cutaway view showing a portion of the drive mechanism of the saw shown in FIG. 1.
Figure 6A:
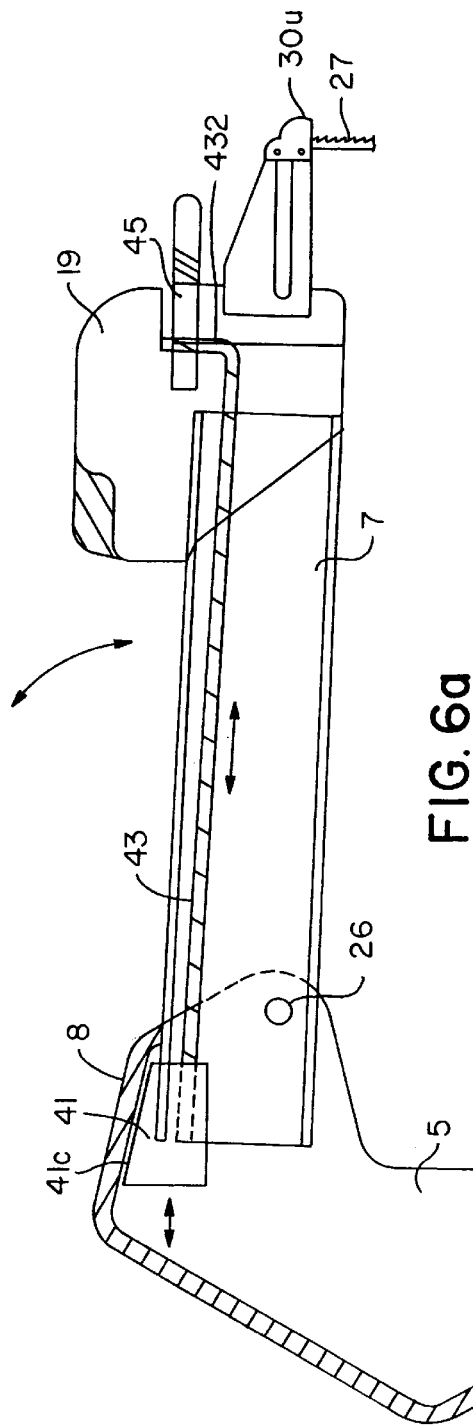
FIG. 6a is a cutaway side elevation view of the upper arm of the saw shown in FIG. 1 illustrating the blade tension adjustment mechanism.
Figure 6B:
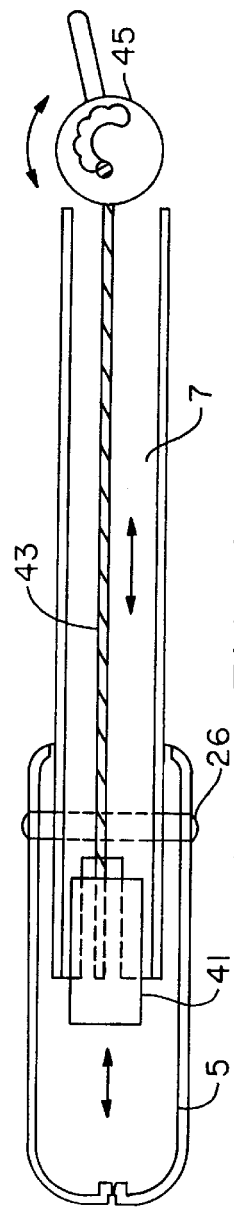
FIG. 6b is an overhead cutaway view of the upper arm of the saw shown in FIG. 1 illustrating the blade tension adjustment mechanism.
Figure 6C:
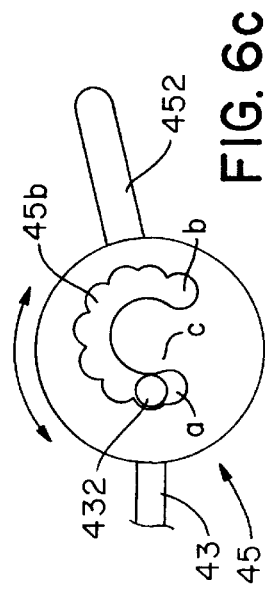
FIG. 6c is a horizontal cross-sectional view of a cam forming part of the blade tension adjustment mechanism.
Figure 7:
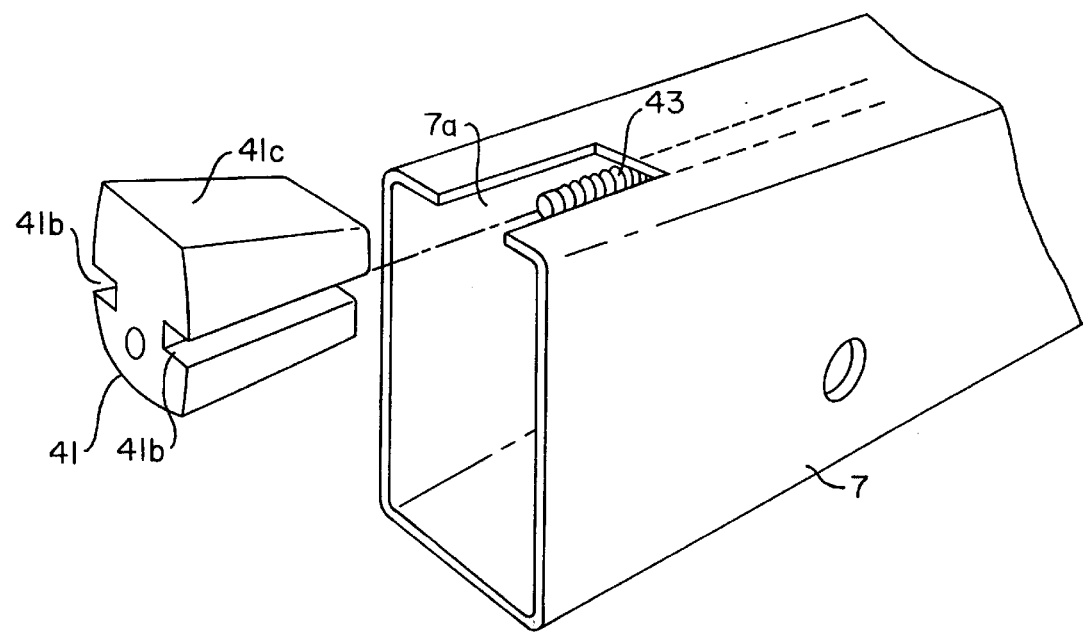
FIG. 7 is a perspective view showing a slidable wedge and a cutout in the upper arm which form part of the blade tension adjustment mechanism of FIGS. 6a–c.

With reference to FIGS. 1 and 2, a scroll saw according to the present invention is shown. Scroll saw 1 includes rear casting or housing 5 having motor housing 6 extending therefrom. The lower end of casting 5 includes rear foot support 5a. Saw 1 also includes front foot support 3. Lower stationary arm 9 extends between and is supported by foot supports 3 and 5a. Table 11 is supported jointly by lower stationary arm 9 and a vertical support arm extending from the upper surface of foot support 3. Upper stationary arm 7 at the rear fits through an opening formed in casting 5, and extends forwardly over table 11. Upper stationary arm 7 is mounted about pivot pin or rod 26 which extends through openings near the rear end of arm 7 and corresponding openings in an upper forward tip portion of casting 5. As shown in FIG. 5, upper stationary arm 7 is mounted within casting 5 with clearances between the upper and lower outer surfaces of arm 7 and the upper and lower inner surfaces of the opening in casting 5. Accordingly, although arm 7 is stationary during operation of the saw as described further below, arm 7 may be pivoted upwardly about pivot pin 26.

With further reference to FIG. 5, saw 1 further includes main rocker 22 which is mounted in casting 5 for pivoting about a central pivot pin. Rocker 22 is conventional and is driven to pivot in a reciprocating manner by the motor (not shown) through a conventional linkage (not shown). The motor and linkage do not form part of the invention. The upper and lower ends of rocker 22 are linked to the rearward ends of upper and lower drive linkages 70a and 70b, respectively. Upper drive linkage 70a extends through upper stationary arm 7 and lower drive linkage 70b extends through lower stationary arm 9. Upper rocker arm 21u is mounted at the forward end of drive linkage 70a, arid is disposed through the forward open end of stationary arm 7.

A rearward portion of upper rocker arm 21u is disposed within arm 7 and a forward portion of upper rocker arm 21u is disposed exteriorly of arm 7. The exterior portion of upper rocker arm 21u has an overall triangular shape. The upper rear corner of the exterior portion of upper rocker arm 21u is pivotably mounted at the forward end of upper drive linkage 70a. The lower rear corner of the exterior portion of upper rocker arm 21u is pivotably mounted to a fixed extension of upper stationary arm 7.

Upper strut 23u also is mounted at the forward end of upper stationary arm 7 and extends below and for substantially the same distance as the exterior portion of upper rocker arm 21u. Upper strut 23u is pivotably mounted at the rear end to a fixed extension of arm 7. The forward corner of upper rocker arm 21u is disposed adjacent to and directly above the forward end of upper strut 23u.

Figure 4:
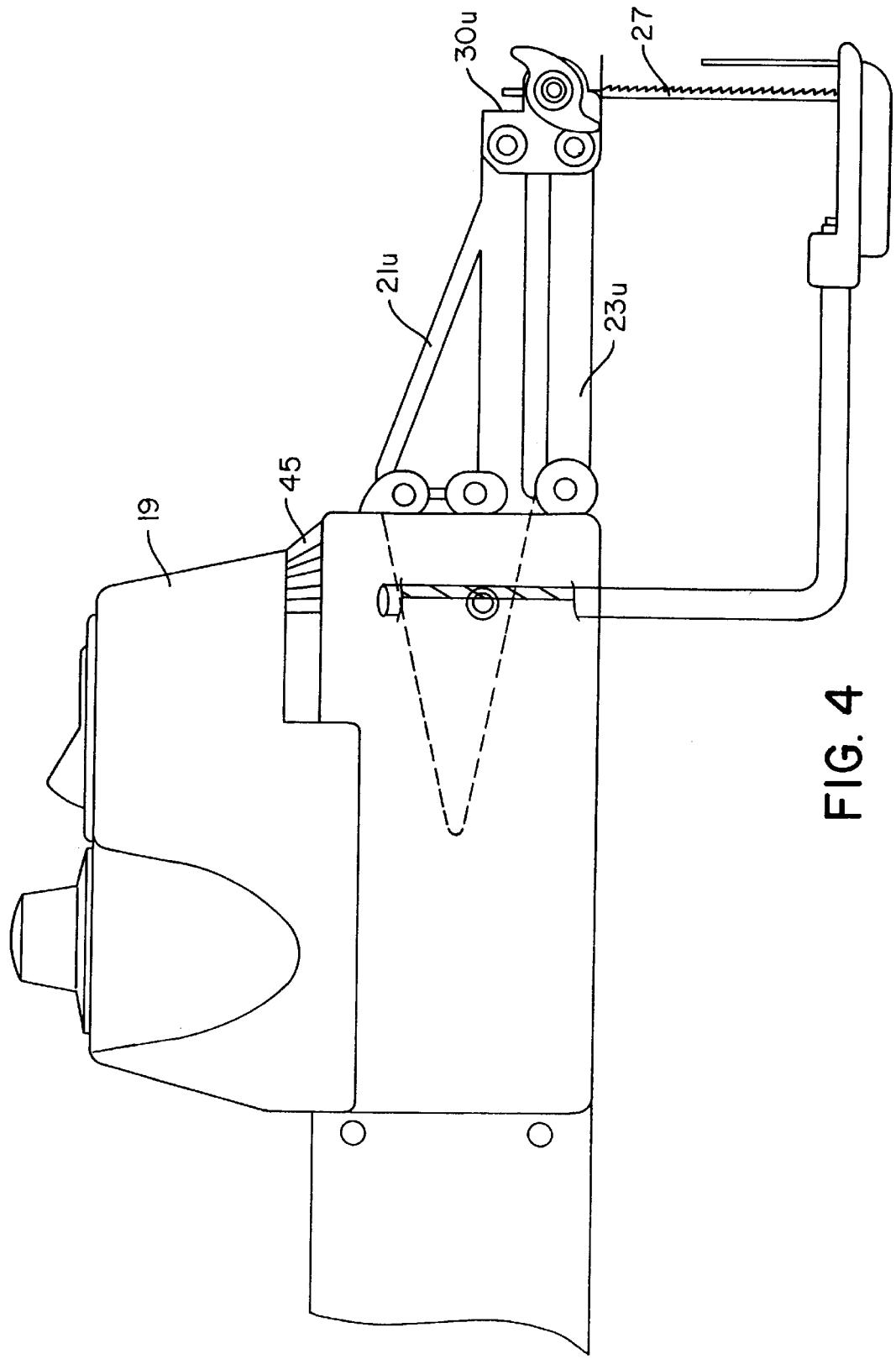
FIG. 4 is a close-up side view taken at the right end of the upper arm of the saw shown in FIG. 1.
Figure 8:
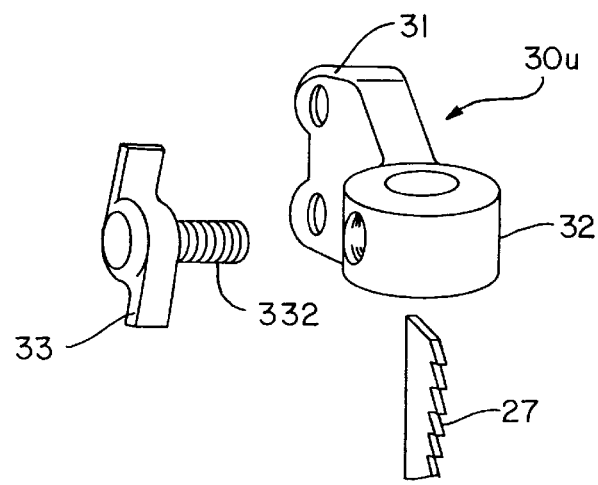
FIG. 8 is a perspective view of a blade clamp used in a scroll saw according to the present invention.

With reference to FIGS. 4 and 8, upper blade clamp 30u includes generally vertical arm 31. An upper end of arm 31 is pivotably secured to the forward corner of upper rocker arm 21u and the lower end of arm 31 is pivotably secured to the forward end of upper strut 23u. Upper blade clamp 30u also includes a generally horizontal disc portion 32 extending forwardly from vertical arm 31. Disc portion 32 includes a vertical opening extending through the upper and lower surfaces, and a screw-threaded horizontal opening extending through one side wall. Blade clamp knob 33 includes screw-threaded portion 33a having a flat forward surface. Portion 33a may be removably screwed into the screw-thread opening. In order to secure blade 27 in upper blade clamp 30u, blade 27 is inserted through the vertical opening in disc portion 32, and knob 33 is rotated to bring the forward surface of portion 33a into contact with the flat surface of the blade. Blade 27 may be removed by unscrewing knob 33.

The structure of lower rocker arm 21l strut 23l and blade clamp 30l secured to lower stationary arm 9 and lower linkage 70b is identical to that of the same elements 21u, 23u, and 30u, respectively as described above. However, the orientation of lower rocker arm 21l relative to lower strut 23l is opposite to that of upper rocker arm 21u and upper strut 23u. In particular, lower strut 23l is disposed above lower rocker arm 21l and lower blade clamp 30l is inverted from upper blade clamp 30u.

In operation, main rocker 22 is pivoted about its pivot point such that the upper and lower ends of rocker 22 reciprocate back and forth, which imparts a reciprocating motion to upper and lower linkages 70a and 70b within upper arm 7 and lower arm 9. When the upper end of rocker 22 is pivoted forwardly, upper linkage 70a is moved forwardly within upper stationary arm 7. The upper corner of the exterior portion of upper rocker arm 21u is pushed forwardly, causing upper rocker arm 21u to pivot clockwise about the lower rear corner of the exterior portion, with the forward corner of upper rocker arm 21u moving downwardly. Upper strut 23 also pivots downwardly due to the link between upper rocker arm 21u and upper strut 23u provided by upper blade clamp 30u. Therefore, upper blade clamp 30u is moved through a downward arc, but maintains a substantially vertical orientation. Since lower linkage 70b is moved rearwardly simultaneously with the forward movement of upper linkage 70a, and since the vertical orientation of lower rocker arm 21l and strut 23l is opposite to that of upper rocker arm 21u and strut 23u, lower blade clamp 30l also is simultaneously moved downwardly through a substantially identical arc, while maintaining a vertical orientation. As a result, both the upper and lower ends of blade 27 are moved downwardly through a vertical arc. When upper linkage 70a and lower linkage 70b are reciprocated in the opposite directions by operation of main rocker 22, blade 27 is moved upwardly along the same arc. In this manner, blade 27 is reciprocated in a vertical plane for sawing action.

With further reference to FIGS. 6a–c and 7, a blade tensioning adjustment mechanism will be described. The mechanism includes wedge 41 having rectangular slots or channels 41b formed in both the left and right side walls. Slots 41b divide wedge 41 into an upper and lower portion, with upper surface 41c of the upper portion inclined relative to channels 41b. Wedge 41 also includes longitudinally extending screw-threaded bore 41a. Upper stationary arm 7 includes rectangular cut-out portion 7a formed through the upper rear portion. The peripheral surfaces of cut-out portion 7a fit within channels 41b such that wedge 41 may slide along the cut-out portion, with the upper portion of wedge 41 disposed above upper stationary arm 7 and the lower portion of wedge 41 disposed within upper stationary arm 7. Upper surface 41c of wedge 41 also is inclined relative to the upper surface of stationary arm 7. In addition, the upper surface of casting 5 is slightly inclined to form ramp 8. Upper surface 41c is disposed adjacent ramp 8.

The blade tensioning mechanism further includes screw-threaded draw rod 43 extending through upper stationary arm 7. The rearward end of rod 43 is screwed into bore 41a of wedge 41. The forward end of draw rod 43 includes upwardly turned arm 43a. Arm 43a fits within track 45b of cam 45. Cam 45 is horizontally and rotatably mounted within head casting 19 at the front of stationary arm 7 and includes handle 45a extending through an opening in casting 19. Rotation of cam 45 by handle 45a causes track 45b to move along arm 43a. Track 45b is formed as an outward spiral such that radially inner end "a" of track 45b is closer to the center point "c" of cam 45 than radially outer end "b". As a result, rotation of cam 45 forces arm 43a and rod 43 to undergo translational motion generally along the longitudinal axis of rod 43. In particular, when cam 45 is rotated such that arm 43a is located near inner end "a", rod 43 is in the forward-most position relative to arm 7, and when cam 45 is rotated such that arm 43a is located near radially outer end "b", rod 43 is in the rearward-most position. One surface of track 45b is formed by a succession of arcuate surfaces which serve as seating surfaces for arm 43a. Each seating surface corresponds to a preset translational position for rod 43 relative to stationary arm 7.

The tension of blade 27 may be adjusted by rotating handle 45a to thereby adjust the translational position of rod 43. As described above, rotation of cam 45 in the direction shown by the curved arrow in FIG. 6b–c, results in translational movement of rod 43 and thus wedge 41 in the direction of the straight arrows shown in FIGS. 6a–b. Since upper inclined surface 41c of wedge 41 is disposed adjacent ramp 8, when wedge 41 moves forwardly (to the right) from a rear position, the contact between surface 41c and ramp 8 pushes wedge 41 downwardly. Since wedge 41 is secured to the rear end of upper stationary arm 7, the rear end of the arm also is forced downwardly, causing arm 7 to pivot counterclockwise about pivot rod 26. Accordingly, the front end of arm 7 is forced upwardly, causing a corresponding upward force to act upon the upper end of blade 27. Since the position of the lower end of blade 27 is fixed, blade 27 is stretched, increasing the tension.

Similarly, the tension on blade 27 can be reduced by rotation of cam 45 so as to force rod 43 and wedge 41 rearwardly. Since the contact point between upper surface 41c and ramp 8 is moved upward, the rear end of stationary arm 7 may be moved upwardly, allowing arm 7 to pivot clockwise about pivot rod 26. Arm 7 undergoes such counterclockwise pivoting due to the weight of the various elements disposed on the forward end of arm 7, and their greater distance from the pivot axis than the rear of arm 7. The front end of arm 7 moves downwardly, reducing the tension of blade 27. Cam 45 may be rotated to tension blade 27 through a predetermined range having predetermined tension settings corresponding to the seating surfaces in track 45b.

With reference to FIGS. 3a–3c, a technique for inserting the blade through an opening in a workpiece for sawing from the interior of the opening will be described. This technique takes advantage of the freedom of upper stationary arm 7 to pivot about pivot rod 26. In FIG. 3a, the saw is shown in the normal operating position, with arm 7 disposed substantially parallel to table 11, and blade 27 disposed vertically through an opening in the table. Blade 27 is secured in upper and lower blade clamps 30u and 30l at both its upper and lower (See FIG. 2) ends. In order to insert blade 27 through an opening in a workpiece, the upper end of blade 27 is released from upper blade clamp 30u by unscrewing blade clamp knob 33. Upper stationary arm 7 is then pivoted upwardly about pivot rod 26 as shown in FIG. 3b. Workpiece W is then placed on table 11 with the free upper end of blade 27 inserted through the opening in the workpiece. As shown in FIG. 3c, upper stationary arm 7 is then lowered back into the normal operating position, and knob 33 is retightened to secure the upper end of blade 27. If desired, the tension of blade 27 can then be adjusted as described above.

The provision of pivoting upper arm 7 also provides for quick blade changing. Blade changing requires that blade 27 be fitted through an opening in table 11. The blade may be quickly changed by loosening the lower end of blade 27, and pivoting arm 7 upwardly until the lower end of blade 27 clears through the opening. Blade 27 is then unclamped from upper blade clamp 30u and is replaced by a new blade. Arm 7 is lowered and the new blade is threaded through the opening in table 11, and the lower end is secured in lower blade clamp 30l. The newly installed blade can be tensioned as desired.

Of course, either of the above-discussed procedures could be reversed. That is, for threading a blade through a workpiece, lower blade clamp 30l could be loosened and the blade could be threaded through the workpiece by lowering arm 7 with the blade secured thereto. For quick blade change, upper blade clamp 30u could be loosened and upper arm 7 can be pivoted upwardly out of the way. Thereafter, the lower blade clamp would be loosened and the blade pulled upwardly through table 11 by hand.

We claim:

1. A saw comprising:
   a housing having an inner surface;
   a pivoting arm having rearward and forward ends, the rearward end of said pivoting arm disposed within an opening in said housing and said pivoting arm extending forwardly from said housing, said pivoting arm vertically pivotable relative to said housing about an axis intermediate of the rearward and forward ends;
   a first blade clamp mounted on a drive linkage, said drive linkage being mounted generally at the forward end of said pivoting arm, said first blade clamp securing one end of a saw blade wherein during use of said saw blade to cut a workpiece, said pivot arm does not reciprocate with said drive linkage;
   a wedge disposed within said housing, said wedge disposed adjacent the inner surface of said housing, said wedge disposed in contact with and translatable along a surface of said pivoting arm; and
   a rod linked to said wedge and extending through said pivoting arm; wherein,
   longitudinal translational movement of said rod causes translation of said wedge along said pivoting arm and said inner surface such that when the wedge moves forwardly contact between the wedge and the inner surface causes the wedge and the rearward end of the pivoting arm to pivot downwardly and the forward end of the pivoting arm to pivot upwardly thereby causing upward movement of the blade clamp to increase the tension of the blade.

2. The saw recited in claim 1 further comprising a second blade clamp, said second blade clamp holding a lower end of the blade and said first blade clamp holding an upper end of the blade.

3. The saw recited in claim 1 further comprising a rocker arm and strut pivotably mounted at a forward end of said pivoting arm, said blade clamp secured at forward ends of said rocker arm and strut.

4. The saw recited in claim 1 further comprising a rotatable cam, said rod linked to said cam such that rotation of said cam causes longitudinal translation said rod.

5. The saw recited in claim 4, said cam including a spiral track disposed substantially horizontally, the track having a radially inner end and a radially outer end, said rod including an upwardly turned arm fitting within said track, wherein,
   rotation of said cam causes the track to move along said rod arm and thereby causes said rod to undergo longitudinal translational movement relative to said pivoting arm such that when said rod arm is located near said radially inner end, said rod and said wedge are in a forward-most position and the blade is at a maximum tension and when said rod arm is located near the radially outer end, said rod and said wedge are in a rearwardmost position and the blade is at a minimum tension.

6. The saw recited in claim 5, said track having a succession of seating surfaces for said rod arm, each seating surface corresponding to a preset translational position for said rod.

7. The saw recited in claim 6, said wedge including lateral slots and a longitudinally extending bore, said pivoting arm including a cut-out portion formed in an upper surface, said cut-out portion having peripheral surfaces fitting within said lateral slots, said rod secured within said bore.

8. The saw recited in claim 1, wherein said inner surface of said housing is inclined to form a ramp and said wedge has an inclined surface which is adjacent said ramp.

9. The saw recited in claim 8, said wedge including lateral slots, said pivoting arm including a cut-out portion formed in an upper surface, said cut-out portion having peripheral surfaces fitting within said lateral slots.

10. The saw recited in claim 1, said pivoting arm disposed at an upper location of said housing, said saw further comprising:
    a lower arm, said lower arm fixed to and extending forwardly from said housing;
    an upper drive linkage extending longitudinally forward from said housing through said pivoting arm, said first blade clamp linked to said upper drive linkage;
    a lower drive linkage extending longitudinally forward from said housing through said lower arm;
    a second blade clamp linked to said lower drive linkage;
    a pivoting rocker linked to both said upper and said lower drive linkages, said rocker pivoting to reciprocate said linkages within a respective upper and lower arm.

11. The saw recited in claim 1, said saw comprising a scroll saw.

* * * * *